(Model.)

3 Sheets—Sheet 1.

A. H. KENNEDY.
GEOMETRICAL BLOCK.

No. 270,225.  Patented Jan. 9, 1883.

Witnesses:
E. E. Wesseler
Jno. W. Graham

Inventor.
Albert H. Kennedy.

(Model.)
A. H. KENNEDY.
GEOMETRICAL BLOCK.
No. 270,225.
Patented Jan. 9, 1883.
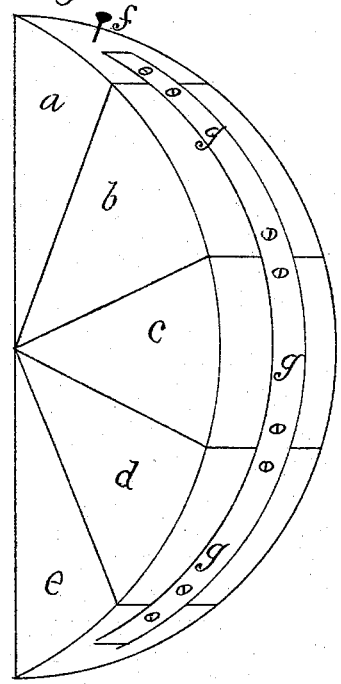
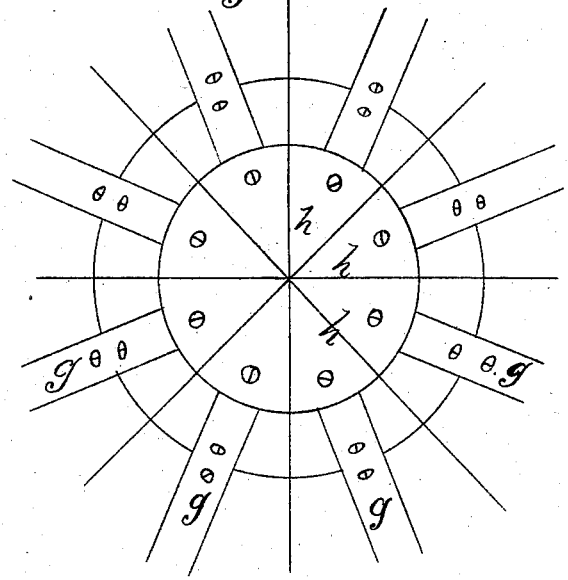
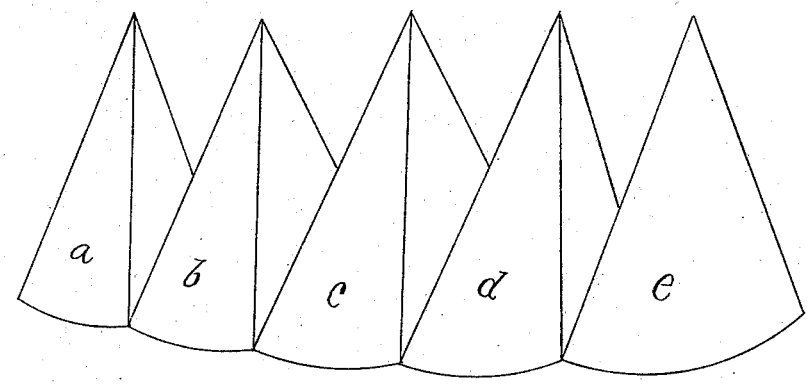
Witnesses:
E. E. Wesseler
Jno. N. Graham
Inventor.
Albert H. Kennedy.

(Model.)
A. H. KENNEDY.
GEOMETRICAL BLOCK.
No. 270,225.
3 Sheets—Sheet 3.
Patented Jan. 9, 1883.
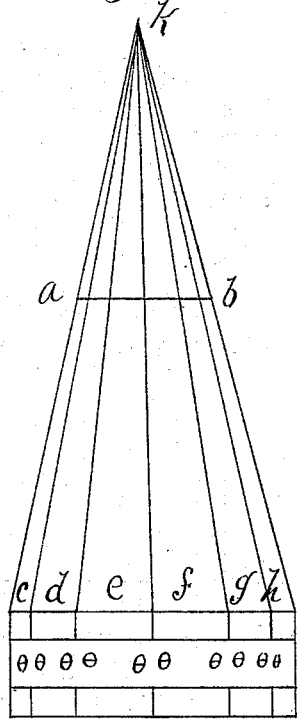
Witnesses:
E. S. Wessler
Jno. N. Graham
Inventor:
Albert H. Kennedy

UNITED STATES PATENT OFFICE.

ALBERT H. KENNEDY, OF ROCKPORT, INDIANA.

GEOMETRICAL BLOCK.

SPECIFICATION forming part of Letters Patent No. 270,225, dated January 9, 1883.

Application filed June 22, 1881. (Model.)

*To all whom it may concern:*

Be it known that I, A. H. KENNEDY, a citizen of the United States, residing at Rockport, in the county of Spencer and State of Indiana, have invented a new and useful Set of Geometrical Blocks, of which the following is a specification.

My invention relates to improvements in geometrical blocks in which the several round surfaces and solids are dissected, so that their parts may be separated and show the elements of which they are composed and be rearranged into simpler forms, and thus illustrate the rules of mensuration.

The objects of my invention are to provide cheap and durable hinges for the several forms—such as can be fitted to the elementary parts by machinery—to so fit these hinges that they may keep the parts to which they are fastened in perfect line, and afford an easy and a rapid manipulation. I attain these objects by the mechanisms illustrated in the accompanying drawings, in which—

Figure 1:
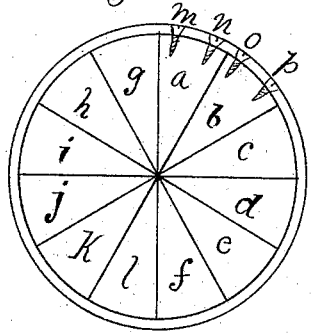
Figure 2:
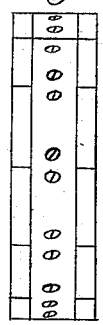

Figure 1 illustrates the circle and its elementary structure. A cylinder of sufficient length is divided into an even number of sectors, $a\ b\ c$, &c. A strap is embedded into its circumference and secured to the several sectors by screws, as shown at $m\ n\ o$, &c. Fig. 2 shows one edge or convex side of this cylinder, the embedded strap, and the screws.

Figure 3:
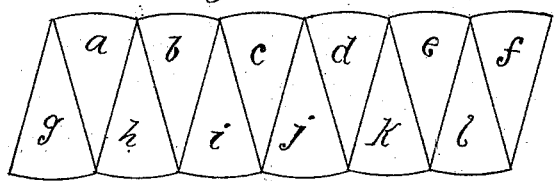

Fig. 3 illustrates the use of the apparatus. One half of the sectors shown in Fig. 1, $a\ b\ c$, &c., are interposed into the other half, $g\ h\ i$, &c., making a parallelogram whose dimensions are the circles' semi-circumference and semi-diameter.

Figure 4:
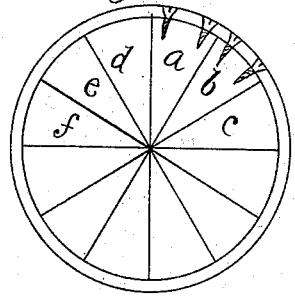
Figure 5:
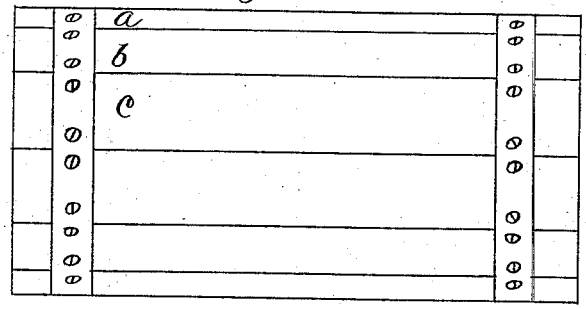
Figure 6:
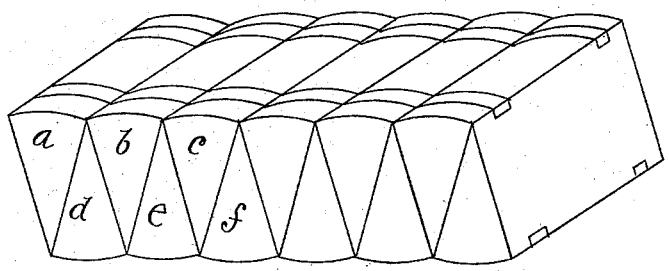

Figs. 4, 5, and 6 illustrate the cylinder. Fig. 4 is a cross-section at right angles to the axis through the embedded strap and the screws that fasten it to the several parts, $a\ b\ c$, &c. Fig. 5 shows the convex surface of the cylinder, the two embedded straps and the screws that fasten them to the several cylindrical wedges. Fig. 6 illustrates the use of the apparatus—viz., one half of the cylindrical wedges, $a\ b\ c$, &c., of Fig. 4 is interposed in the other half, $d\ e\ f$, &c., forming a parallelopiped whose dimensions are the cylinder's length, semi-circumference, and semi-diameter.

Figs. 7, 8, and 9 illustrate the sphere. Fig. 7 represents a spherical wedge, in which $a\ b\ c$, &c., represent the pyramids of which it is composed. These pyramids are connected together by a strap and screws, $g\ g\ g$, &c., embedded in their bases. Fig. 8 shows Fig. 7 unfolded. Fig. 9 shows how the several spherical wedges that make up a sphere are united. $h\ h$, &c., is a circular piece of leather, fastened by screws to the ends or poles of the several spherical wedges. $g\ g\ g$, &c., represent the embedded straps. By these means the sphere can be unfolded and its several spherical wedges made to assume the form shown in Fig. 8; or they can be closed up and each made to assume the form shown in Fig. 7, making a complete sphere. By means of the pins or staples shown at $f$, Fig. 7, and an encircling string all the parts may be held in a spherical shape.

Fig 10 illustrates the cone and the frustum of the cone. The method of hinging the several parts, $c\ d\ e$, &c., is the same as described above in Figs. 1 and 2. The apparatus shows that the cone's surface is composed of triangles, and that the convex surface of the frustum of a cone cut off at $a\ b$ is composed of trapezoids.

The advantages of the methods of hinging the several elements of the forms described above are manifest. By embedding a strap as described the several forms maintain their symmetry, are strong and durable, are kept in perfect line, and can be rapidly transformed, so as to show in the most forcible manner their structure and the fundamental principles upon which their measurement is based.

I am aware that prior to my invention dissected geometrical blocks have been made. The idea that underlies the system is as old as Euclid. He makes the triangle the element of the circle and the cone's convex surface, and the pyramid the element of the cone's and the sphere's volume. It is manifest therefore that only the methods of hinging the dissected or elementary parts are patentable. I therefore do not broadly claim to have invented the system; but What I do claim as my invention, and desire to secure by Letters Patent, is—

1. The dissected blocks or segments of a sphere, substantially as shown and described, having the channeled sections, the straps or hinges connecting them together, substantially as and for the purpose set forth.

2. The combination of the grooves and the embedded strap by which the parts or elements of the several round bodies herein described are held together and kept in perfect line, and the whole made strong and durable, substantially as and for the purpose set forth.

A. H. KENNEDY.

Witnesses:
W. C. SHAW,
FRANK A. NIBLACK.